United States Patent Office 3,180,365
Patented Apr. 27, 1965

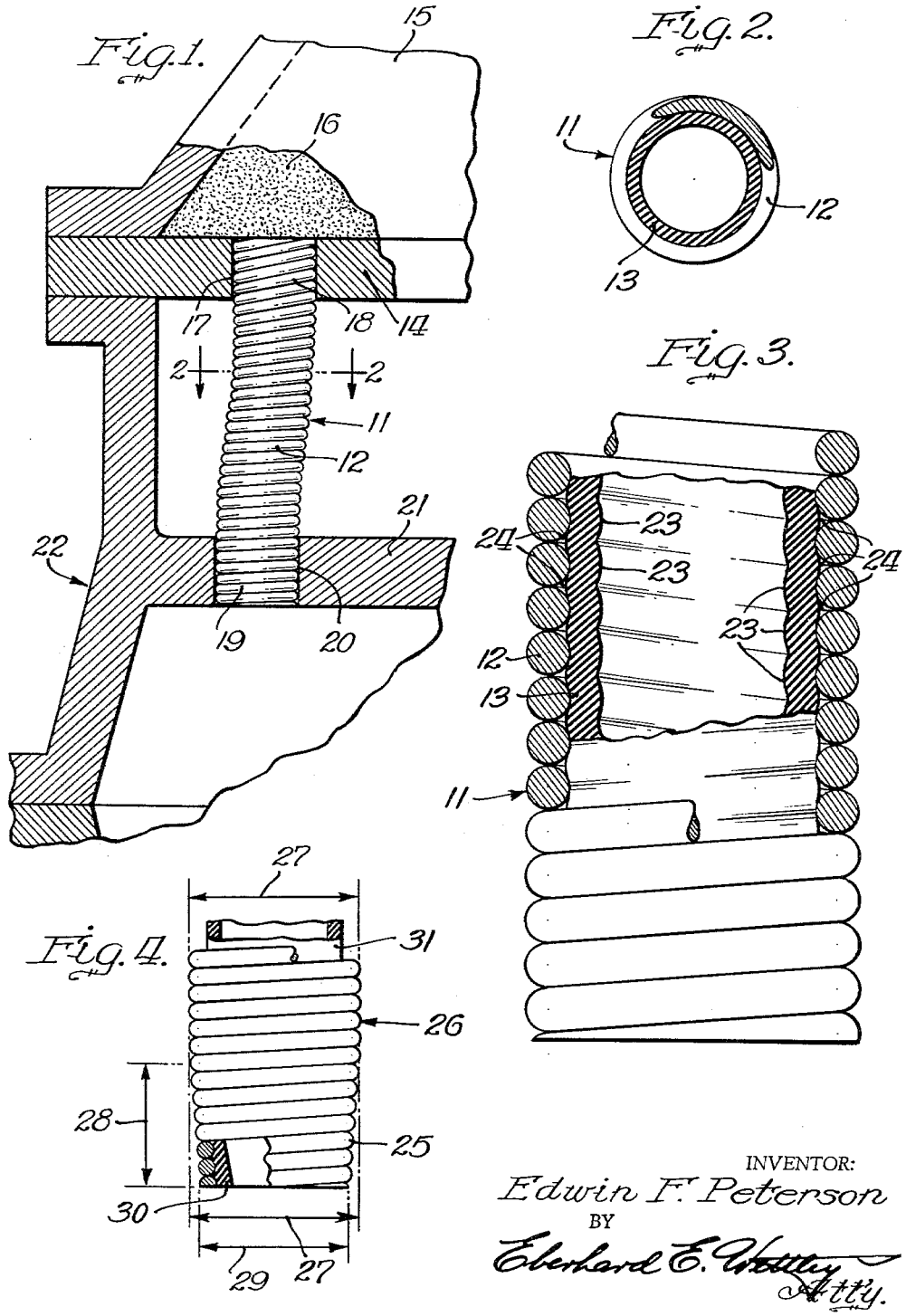

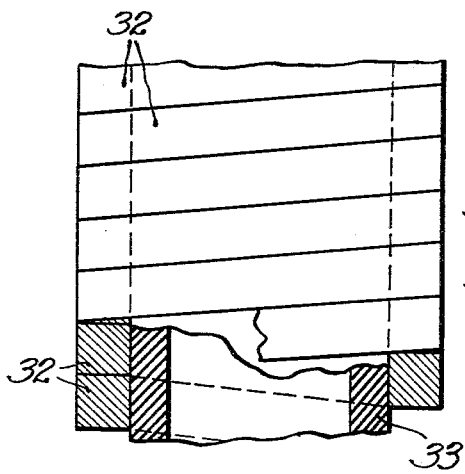
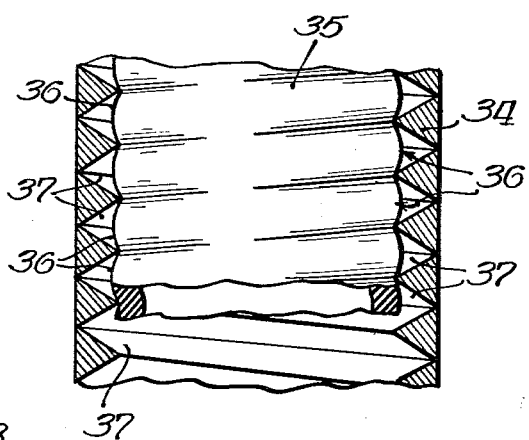
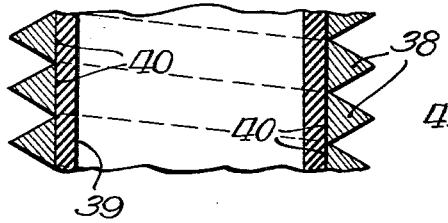
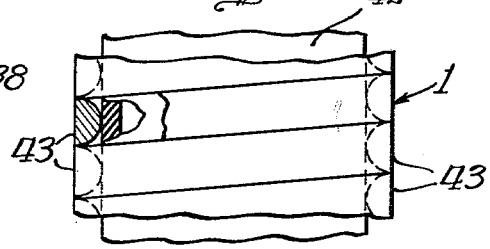
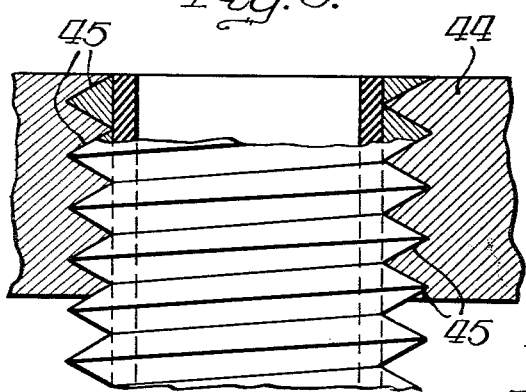
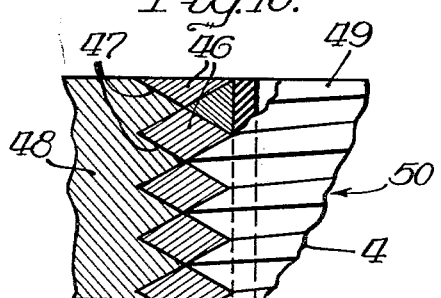
INVENTOR:
Edwin F. Peterson
BY
Eberhard E. Wetty
Atty.

---

3,180,365
RESILIENT WEAR RESISTANT BLOW TUBE
Edwin F. Peterson, P.O. Box 151, Neponset, Ill.
Filed Dec. 1, 1960, Ser. No. 73,018
1 Claim. (Cl. 138—134)

This invention is directed to a composite blow tube providing a resilient metallic outer jacket lined with a resilient inner wear resistant elastomer jacket.

In its more specific aspects, this invention relates to a blow tube that is flexible and may be readily adapted for assembly and operation between aligned openings in a blow plate of a reservoir or sand blowing magazine and in a core box part. The tube further has the facility to flex relative to its own normal straight axis to accommodate itself to openings of the general nature described which may be misaligned with respect to each other, or wherein one or the other or both of the openings are not provided upon true vertical axes in relation to the parts having the openings that receive the blow tube.

One of the objects of this invention, therefore, is to provide a blow tube of flexible characteristics capable of confining and conducting core sand under pressure through the space lying between a sand reservoir and a core box assembly.

Another object relates to the provision of a composite blow tube having a spring wound outer jacket, lined with a resilient wear resistant tubular inner jacket or liner.

As another object, the invention contemplates the use of a composite blow tube having a divided metallic multiple structural outer jacket that is adapted to hold and retain a resilient tubular inner liner protecting the outer jacket from internal wear, the tubular liner being constructed from material that may or may not be bonded, the non-bonding material being such as Teflon and the silicones. Both Teflon and silicone liners are tough and smooth, as well as capable of flexing, and they may be employed under high temperature conditions where operations necessitate such use.

Another object of this invention is the facility of a composite tube comprising a spring wound outer jacket and an elastic or resilient tubular inner liner or jacket to provide an assembly having limited choke action to permit the constrictive retention of blow tube material after the blowing cycle. For example, a round wire spring establishes an internal spiral groove between coils lying adjacent the resilient inner tubular liner, and the latter will expand into the grooved portions of the spring during the blow and retract radially inwardly after the blow to hold the column of blow tube confined material.

In furtherance of the object above in creating a choke tube, it is another advantage to provide a dual or composite tube wherein the resilient inner liner is slightly larger in outside diameter than the internal diameter of the spring wound jacket, whereby the liner is better held and it is normally internally spirally rippled a given amount within the coil spring jacket. Under operative conditions, the liner will expand to a greater extent during the blowing period to resume a radially inwardly static shape after pressure release, causing a choke hold upon the material that is left within the tube.

Another object is to provide a wire wound jacket having an inwardly tapered end discharge portion to grasp the resilient liner in a tapered shape to provide another form of choke to hold the material in the tube after release of pressure on the material being conducted through the tube.

A still further object is to provide a blow tube having an outer jacket member of coiled wire or the like which may be surface ground to a given external diameter to fit acceptance holes of the outer diameter of the jacket.

As a further object, the blow tube of this invention in external coil form, establishes a means that may be expanded limitedly in outside diameter, or reduced limitedly in outer diameter, by unwinding the coiled jacket turns in the first case and by winding or twisting the lay of the coils of the units to tighten the coils in the second situation.

Other objects reside in the provision of different kinds of wire windings providing vertically continuous adjacent coils to form the outer jacket of the lined tube, wherein the coils are represented by wire of different cross sectional shapes. The jacket wire may be of circular cross sectional shape, or of triangular, square or diamond cross sectional shape, thus extending the use of the blow tube and expanding the selective uses thereof under certain conditions of operation and function.

All other objects and advantages relating to the dual or composite articulated blow tube of this construction and invention shall hereinafter appear in or become evident from the following detailed description having reference to the accompanying drawings providing certain exemplary constructions of blow tube and illustrating the functions thereof in carrying out the principles of the invention herein disclosed.

In the drawings:

FIG. 1 is a vertical cross sectional view of a sand box and core box arrangement embodying a blow tube of the present invention as the conducting instrumentality to pass core sand under pressure from the sand reservoir to the interior cavity of the core box;

FIG. 2 is a transverse cross sectional enlarged view of the tube in FIG 1, the tube structure being shown substantially as it appears along the plane of the line 2—2 in FIG. 1;

FIG. 3 is a greatly enlarged side elevational view of a fragmentary part of the blow tube with portions thereof being broken away and shown in section to further expose certain details of construction of the dual articulate tube;

FIG. 4 is another fragmentary side elevational view of a blow tube, partially shown in section, to illustrate a modified structure to accentuate the choke operation;

FIGS. 5 and 6 illustrate tube portions in side elevation and in partial section, of modified jacket or exterior shell constructions;

FIG. 7 is a fragmentary sectional view of another modified form of tube following the FIG. 6 construction, but wherein the points of the triangular spring jacket face radially outwardly instead of radially inwardly;

FIG. 8 illustrates a tube with a ground external surface; and

FIGS. 9 and 10 illustrate certain assembly features possible in the use of tubes similar to the tube shown in FIG. 7.

FIGS. 1 to 3 show one form of blow tube 11 as a simple and exemplary device of this invention, comprising an outer wound wire coil jacket 12 supplied with a tightly held inner tubular liner 13 of resilient material, members 12 and 13 thus forming a composite dual coaxial assembly of two flexible units. It is within the concept of this invention to develop a coil jacket 12 having a given external diameter to snugly fit into equal diameter openings provided for the blow tube 11.

In FIG. 1, blow tube 11 is provided as a conduit to deliver core sand to a core box under a core blowing operation. The blow plate 14 of a core sand box or magazine 15 filled with core sand 16, is provided with an opening 17 to snugly accept the upper part 18 of the blow tube 11, while the lower part 19 of the blow tube is snugly seated in an opening 20 established in the wall of a core box section 21 of a conventional core box 22.

It is usual practice to securely attach core box section 21 of core box 22 to the magazine 15 and more specifically to the blow plate 14 as will be apparent to those skilled in the art.

It should be observed that the openings 18 and 19 are illustrated as not being in vertical alignment which demonstrates the adaptability of a blow tube of flexible design for core box blowing or for like purposes under analogous conditions of use. With most constructions or assemblies, the tube receiving openings would normally be aligned, but any deviation from true alignment can be readily and easily functionally remedied with a tube of the nature such as the tube 11.

The tube 11 of the construction described embodies certain principles that form the concept of the present invention. Any kind of a metal tube or jacket would quickly wear away and deteriorate under the abrasive action of core sand moving therethrough under the propulsion of air under pressure. It is, therefore, a purpose of this invention to line the metal jacket with a wear resistant material such as a natural rubber, an elastomer, or with any form of a liner of resilient material having the characteristics of rubber. One example would be a tubular member of Buna N, a synthetic composition. Other materials such as polyurethane rubber made into tubular members provide good wear resistant inserts or liners for the metallic jackets.

The liners do provide the wear resistant means for the exterior metallic tube, but the outer tube cooperatively provides the dimensional stability means for the elastic or resilient tubular liner, permitting the use of practical sized wear resistant tubes for such liners.

The blow tube contemplates the use of liners having oversized outer diameters in comparison to the internal diameters of the articulate spring coils of the jackets. By drawing the liner into a jacket coil under the diameter conditions noted, the liner will expand tightly and radially into the coiled jacket to produce a rippled liner as at 23 conforming to the spiral grooved portions 24 of the coiled spring jacket as best illustrated in FIG. 3. Under operative pressurized core blowing conditions, the liner will additionally expand radially along the grooved part of the jacket coils to react radially inwardly on termination of the blowing cycle to establish a core sand choke tube to hold and retain tube contained core sand.

Thus the tubular liner 13 is frictionally held within its coil spring jacket 12 under static conditions during normal conditions of use, protecting the jacket from abrasion, and functioning as a choking means for core sand retention between blows. The jacket provides the dimensional stability member of the tube, acts to retain the straight line of shape of the dual tube, and both jacket and liner can flex to accommodate the tube ends to out of line or tilted axis openings in the units connected by such a tube for core sand or material transfer from unit to unit.

While different cross sectional wire coils for the jacket or tube exterior may form greater clearance areas about the liner, the tube assembly of FIG. 6 for example, it is possible to taper wind the jacket 12 as at 25 in tube 26 as illustrated in FIG. 4. The normal tube diameter is indicated at 27—27, the tapered length of the tube at 28, and the mouth exit external diameter of the tube is indicated at 29. The portion 30 of the liner 31 is thus inwardly directed as a choke exit and circumferentially thickened at this point to afford a greater material mass at a location subject to greater abrasive wear, which is a real benefit in a blow tube of this character and construction.

Other tube forms may be used for the dual jacket tube. FIG. 5 shows a square spring wire 32 enclosing and holding a resilient liner 33. Such members together provide an elastic tube and a wear resistant assembly with a continuous divided but solid surfaced exterior under normal use.

FIG. 6 shows a triangular wire jacket 34 with inwardly directed points confining a resilient liner 35, the liner being expanded spirally at 36 into the spaces 37 appearing about the interior of the jacket between successive coils of wire.

FIG. 7 shows a triangular wire wound jacket 38 with the points of the wire disposed outwardly about the circumference of the jacket. The resilient liner 39 in this case hugs the adjacent aligned flats 40 of the jacket wire coils.

In FIG. 8, the round wire jacket 1 encircles a snugly held liner 42, and the outer face portions 43 of the wire coils are here shown as circumferentially ground down to a given sized external diameter of tube. This may be done with jackets constructed with other shapes of wire with equal facility and adaptability.

FIG. 9 shows a blow plate 44, as an example, which has a tapped hole 45 arranged to receive a blow tube such as that shown in FIG. 7, which can be threaded into the hole 45 for operative retention.

By way of a further variation for size accommodation, FIG. 10 shows a diamond shaped wire sleeve 46 screwed into a tapped hole 47 in a plate member 48 to receive one end 49 of a triangular wire jacket blow tube 50. Thus a blow tube of smaller external triangular wire jacket can be fitted into a larger tapped opening in a blow plate or core box section.

The diamond wire can also be used as a jacket or articulate tube casing to retain an elastic liner therein in the same manner as illustrated by the tubes 11, 32, 34, 38, etc.

With flexible blow tubes of the character herein disclosed, it is entirely possible and feasible to employ longer tubes between a sand magazine and a core box in situations where the core box may extend to any side beyond the normal vertical area served by the sand magazine or to any side where a core box overhangs the core box supporting table. The tubes may be well flexed or bent to meet such situations without any danger of blowouts between the jacket coils. The tubes can also be secured into holes provided in the side walls of a core sand magazine to lead and curve downwardly to enter a core box laterally beyond the normal blow plate area.

Attention is again directed to the advantageous extended uses and adaptability of blow tubes of the composite character herein disclosed, with the further facility of opening the way to incorporate liner materials that do not lend themselves to blow tubes of other constructions of analogous devices.

Thus it is possible to make dual walled tubes of the resilient kind described using liners of unbondable material, or at least of material that is very difficult to bond. Such materials, for example, are on the order of the elastomers derived from silicones and Teflon (tetrafluoroethylene). Such rubber like materials are heat resistant although relatively weak as rubber like materials go. The double tube system is an ideal way by which to feasibly assemble such stocks into operative liners for hot operation blow tubes.

In blow tubes having outer spring shells or jackets providing flexible walls of wound wire or the like, such spring wound means can be constructed with initial tension induced between the vertically adjacent wraps or consecutive coils to develop a stiff wall member. A spring wound unit of this kind would behave like a steel tube insofar as end on compression or endwise driving of the tube is concerned. This is an important attribute and beneficial consideration when it comes to the driving or pressing a tube of this nature into an opening prepared for the reception of an end of the tube. Spring wound members that are made with looseness between the wraps or successive coils cannot be so driven.

The above description relates to certain preferred and suggested tube structures that embody the fundamental concept of this invention. The forms shown are not to be construed as limitations since other modifications are deemed possible and are contemplated in the practice of this invention. The extent of further changes are, therefore, not to be limited except as governed by the breadth and scope of the language hereinafter contained in the following claimed subject matter covering the resilient wear resistance below of this invention.

What I claim is:

A blow tube comprising a tightly wound spring wire external metal jacket forming a continuous enclosure and a resilient tubular wear resistant liner tightly confined within said enclosure jacket, said liner being constructed of Teflon having non-bondable characteristics.

References Cited by the Examiner

UNITED STATES PATENTS

| | | | |
|---|---|---|---|
| 270,810 | 1/83 | Kaye | 138—144 |
| 325,591 | 9/85 | Coultaus | 138—134 |
| 559,968 | 5/96 | Brooks | 138—134 |
| 680,748 | 8/01 | Welling | 138—134 |
| 776,737 | 12/04 | Greenfield | 138—150 XR |
| 1,136,329 | 4/15 | Goodall | 138—134 |
| 1,816,740 | 6/31 | Ogren | 138—134 |
| 2,418,628 | 4/47 | Dodd | 137—571 |
| 2,463,052 | 3/49 | Petry | 137—571 |
| 2,706,494 | 4/55 | Morse | 138—134 XR |
| 2,807,432 | 9/57 | Parker et al. | 285—239 |
| 2,932,065 | 4/60 | Jenkins. | |

FOREIGN PATENTS 168,654  3/06  Germany.

LEWIS J. LENNY, *Primary Examiner.*

CARL W. TOMLIN, EDWARD V. BENHAM,
*Examiners.*